(12) United States Patent
Forkosh et al.

(10) Patent No.: US 11,679,302 B2
(45) Date of Patent: Jun. 20, 2023

(54) ONLINE, REAL-TIME, SYNCHRONIZED TRAINING SYSTEM FOR MULTIPLE PARTICIPANTS

(71) Applicant: DRIBBLEUP, INC, Woodmere, NY (US)

(72) Inventors: Eric Forkosh, Woodmere, NY (US); Marc Forkosh, Woodmere, NY (US); Ben Paster, Brooklyn, NY (US)

(73) Assignee: DribbleUp, Inc., Woodmere, NY (US)

( * ) Notice: Subject to any disclaimer, the term of this patent is extended or adjusted under 35 U.S.C. 154(b) by 0 days.

(21) Appl. No.: 17/733,264

(22) Filed: Apr. 29, 2022

(65) Prior Publication Data

US 2022/0331662 A1 Oct. 20, 2022

Related U.S. Application Data

(63) Continuation of application No. 16/930,706, filed on Jul. 16, 2020, now Pat. No. 11,369,843.

(51) Int. Cl.
*A63B 24/00* (2006.01)
*A63B 71/06* (2006.01)
*G06V 40/20* (2022.01)

(52) U.S. Cl.
CPC ...... *A63B 24/0075* (2013.01); *A63B 24/0006* (2013.01); *A63B 24/0062* (2013.01); *A63B 71/0622* (2013.01); *G06V 40/23* (2022.01); *A63B 2024/0009* (2013.01); *A63B 2024/0015* (2013.01); *A63B 2024/0068* (2013.01); *A63B 2071/063* (2013.01)

(58) Field of Classification Search
CPC .................................................. A63B 24/00
USPC ........................................................ 434/247
See application file for complete search history.

(56) References Cited

U.S. PATENT DOCUMENTS 6,233,007 B1 * 5/2001 Carlbom .............. G01S 3/7865
348/E13.064
6,458,060 B1 * 10/2002 Watterson .......... A63B 24/0087
482/4

(Continued)

*Primary Examiner* — Kesha Frisby
(74) *Attorney, Agent, or Firm* — Smith Tempel Blaha LLC; Matthew T. Hoots

(57) ABSTRACT

A training system operates to provide an online training system that includes an instructional portion, a performance portion and a results report. A trainer can create training modules and/or training programs and then launch a training program in which one or more users, utilizing a user system, can participate. A training program consists of one or more training modules. Each training module is configured to first run in a demonstration mode, in which the operator streams a demonstration of the physical activity required by the training module to one or more user systems. Users can thus view the demonstration of the physical activity on the user systems. The training module then enters a trial or trial mode in which each of the participants then engage in performing the physical activity. The user systems present a video/graphical display to show various performance criteria of the training module. The user systems also include a camera that is configured to monitor the activity of the user weighed against the performance criteria. Once the trial mode is completed, the data gathered by the user system cameras is then analyzed and evaluated and presented back to the participants.

10 Claims, 7 Drawing Sheets

(56) References Cited

U.S. PATENT DOCUMENTS

| | | | |
|---|---|---|---|
| 7,264,554 B2* | 9/2007 | Bentley | A63F 13/213 |
| | | | 473/409 |
| 9,084,924 B2* | 7/2015 | Jones | A63B 24/0062 |
| 9,275,470 B1* | 3/2016 | Forkosh | G06T 11/60 |
| 9,589,207 B2* | 3/2017 | Holohan | G06V 40/23 |
| 2008/0145829 A1* | 6/2008 | Huang | G09B 5/06 |
| | | | 434/308 |
| 2013/0216990 A1* | 8/2013 | Chu | G09B 5/065 |
| | | | 434/247 |
| 2014/0195019 A1* | 7/2014 | Thurman | A63B 41/02 |
| | | | 700/91 |
| 2014/0300733 A1* | 10/2014 | Mitchell | G06V 20/20 |
| | | | 348/135 |
| 2015/0279230 A1* | 10/2015 | Khemaney | G09B 19/003 |
| | | | 434/257 |
| 2019/0076700 A1* | 3/2019 | Quillin | H04N 7/181 |
| 2020/0009444 A1* | 1/2020 | Putnam | H04M 1/72409 |

* cited by examiner

ONLINE, REAL-TIME, SYNCHRONIZED TRAINING SYSTEM FOR MULTIPLE PARTICIPANTS

CROSS-REFERENCE TO RELATED APPLICATIONS/PATENTS

The present invention relates co-owned U.S. Pat. No. 9,275,470, issued on Mar. 1, 2016 to Forkosh et al., and is a continuation of U.S. application Ser. No. 16/930,706, filed on Jul. 16, 2020 and entitled ONLINE, REAL-TIME, SYNCHRONIZED TRAINING SYSTEM FOR MULTIPLE PARTICIPANTS. The contents of both U.S. Pat. No. 9,275,470 and Ser. No. 16/930,706 are entirely incorporated herein by reference.

TECHNICAL FIELD

The present invention relates generally to a system and method for providing online training sessions for multiple parties that may be remotely located. More specifically, the various embodiments of the invention presented herein relate to a system and method for generating or creating training sessions or programs at a main location and then broadcasting the training sessions to multiple user devices remotely located parties either in real-time, or in some embodiments at a later time. The broadcasted training session includes a video component to be presented on the user devices, along with a synchronization component used to synchronize the display on the user devices. The training sessions include a demonstration mode, wherein a demonstration of a physical activity is streamed in real-time to the participants, followed by a trial period in which the remote participants perform the physical activity, and an analysis application that detects and monitors the motion of the participants or objects controlled by the participants weighed against physical requirements of the physical activity to score, rank and report the results of the users.

BACKGROUND

There is a large and growing need for online training of remotely located participants. There are many reasons for this expanding need. One reason is that a specialized and/or well renown athlete or trainer (hereinafter trainer) is greatly limited in the audience that he or she can train, server or assist. Generally, such athletes or trainers are limited to a physical location, such as a gym or training facility, that is only accessible to local participants. Thus, to expand the trainer's audience, the trainer must rely on participants coming to the trainer's facility or location or, the trainer must travel to other locations. This limitation could be greatly alleviated with an adequate online training system.

The need for online training systems has also recently experienced a drastic increase in view of the global pandemic of Covid-19 that has forced the world to rethink and reevaluation participation in activities that require groups of people to be in close proximity with others.

Many problems arise in attempting to create and furnish an online training experience that would rival the experience one would get in a "in facility" training system. During the Covid-19 pandemic, many have tried hosting such events using technology that was really developed only for conferencing, not physical training. As such, the user experience with online training has at best, been significantly inadequate.

There are many challenges that must be faced in the provision of an online training system and method that is geared towards multiple party audiences that are remotely located. This is especially true when the training requires monitoring and judging the performance of the participants and synchronizing the operational mode of remotely located devices with a live video feed. The challenge is to create a look and feel that gives the participants an experience that is as functional as an "in facility" experience and that creates a sense of "being together".

The present disclosure presents embodiments that address these and other needs in the art.

SUMMARY

The above-described needs in the art, as well as other needs, are alleviated through the use of various embodiments of the invention disclosed herein and the technical solutions achieved by providing a system and method for providing remote training to a plurality of participants in a real-time manner over a network, and monitoring and tracking the performance of the participants.

In general, an exemplary embodiment is a training system that includes an in-studio system and one or more user systems that are interconnected through a network, such as the Internet as a non-limiting example. Together, the systems operate to provide an online training system that includes an instructional portion, a performance portion and a results portion. The training system, referred to as an "in-studio system", operates as the brains or control center of the various embodiments of the training system. The in-studio system is manned by a trainer or operator that is located in the studio, however, it should be appreciated that in some embodiments the operator may be remotely located from the studio and use a setup similar to the participants and user systems. In some embodiments, the trainer or operator may utilize the in-studio system to create training modules and/or training programs. In other embodiments, the trainer or operator may simply build select training programs from a library of previously created training programs or create training programs from a library of previously created training modules.

The operator also interacts with the in-studio system to launch a training program in which one or more users, utilizing a user system, can participate. A training program consists of one or more training modules. Each training module is configured to first run in a demonstration mode, in which the operator streams a demonstration of the physical activity required by the training module to one or more user systems. Users can thus view the demonstration of the physical activity on the user systems. The training module then enters a training or trial mode in which each of the participants then engage in performing the physical activity. The user systems present a video/graphical display to show various performance criteria of the training module. The user systems also include a camera that is configured to monitor the activity of the user weighed against the performance criteria. Once the trial mode is completed, the data gathered by the user system cameras is then analyzed and evaluated and presented back to the participants.

Thus, it can be appreciated that various embodiments of the present invention enable a training program to be simultaneously presented to multiple participants over the Internet. The overall operation of the training system can be controlled by the operator who can initiate the execution of various training modules, control the transition from a demonstration mode, to a trial mode and then to a results mode. The operator can maintain control of the system and receive real-time feedback regarding how the participants are doing in the training. Utilizing such embodiments of the training system, the operator can actively engage with the participants, provide input and advice, and help to create the look and feel of an in facility experience.

An exemplary embodiment includes a method for providing remote training to one or more participants. The method includes the action of first selecting a particular training program to be executed. The particular training module may reside in the memory of a server or may be created on the fly using a training program editor. The selection of the particular training module may be performed by an operator of the training system or based on a program schedule that a server accesses and then automatically selects the programs according to the schedule. The particular training program incorporates one or more training modules and each training module defines a plurality of modes or phases. Once the particular training program is selected, the particular training program is then launched, executed or run on the server. Again, running the particular training program can be invoked by the operator or be automated by the server based on the program schedule. While running the particular training program, the training modules within the particular training program are sequentially selected from the training program be to executed. It should be appreciated that once a training module is selected, executed and completed, the next training module in the particular training program may be automatically selected and executed by the server or, the operator may control the timing of selecting and executing the next training module. Further, in some embodiments the server may automatically select and begin the next training module but the operator may have the ability to pause or stop the execution if desired.

While executing the training module, the server transmits video content associated with the selected training module to one or more user devices, wherein each of the one or more user devices is operated by one of the one or more participants. Further, for each phase of the training module, the server embeds data within the video content of the current training module to control the operational mode of the user devices in synchronization with phases or modes of the selected training module. The training system also operates to collect motion data utilizing each of the one or more user devices, wherein the motion data represents a correlation of physical activities of the participant associated with a particular user device and physical actions required by the selected training module. In general, the collected motion data is analyzed and in response, the server creates a results report. While the collection of the data is accomplished with the user devices and the results reports are generated by the server, it should be appreciated that the processing and analyzing of collected data can be performed by the app running on the user devices, the server and/or a combination of both.

In an exemplary embodiment, the user application does all the tracking and analyzing of the motion on the user device and generates metric data (i.e. total number of reps, speed, average speed, max speed and/or other processed metrics relating to the participant's performance as non-limiting examples). More specifically, the user devices perform the motion tracking and data collection at the user locations. The user devices then analyze the collected data. Thus, the user devices determine the number of reps completed by the participant, as well as other metrics. The user devices then display these metrics locally to the participant.

The user device may also upload the process data or metrics data to the server over the Internet. In other embodiments, these operations can be shared between the user devices and the server, or some or all of the operations can be performed by the server as well.

The data embedded inside the video operates to instruct or control the user device as to what mode it should be in and associated data with the mode.

Without regard to the particular structure, the motion data is collected, analyzed and then prepared for a results report. The results report can be presented to the user as it is being created or, the user devices may simply hold the information in memory until receiving a command from the server to enter results mode. Once receiving such a command, the user devices present the results data on the displays of the user devices.

The next training module in the training program is then selected and the afore-described process can be automatically repeated for the next training module or may be initiated by operator control.

As previously described, the server exercises a level of control over the user devices by embedding control or command data within the video stream. The level of control may vary in different embodiments but, and the level of autonomy of the user devices may thus also vary. As a non-limiting example, in an exemplary embodiment, the server may control the users devices to sequentially switch from one mode to the next, as well as to include other data embedded commands such as, but not limited to:

1. Show the live stream full screen
2. Start tracking user activity for drill XYZ.
3. Render targets for drill XYZ for a duration N seconds.
4. End tracking of user activity and determine its results.
5. Transmit results to server over the network.
6. Show the final leaderboard. When the user device sees this command, it may then separately requests the leaderboard data from the server over the Internet.
7. Change to mode X. (where each mode is fully defined within the user devices, such as what to present on the display, what actions to take, etc.)

While in various embodiments, the actual phases and modes associated with a training module may vary, in exemplary embodiments, the training module defines (a) a demonstration mode for which the content includes a demonstration video of the operator demonstrating the required physical activity, (b) a trial mode in which the user devices render a performance targets video on the user display, (c) a results mode, and (d) a leaderboard mode. To invoke the user devices to transition to these modes, a specific command is embedded in the video stream delivered to the user devices.

The data commands can be inserted into the video stream at strategic points in the video stream, such as at the beginning of each subsequent phase of a training module. However, it should be appreciated that multiple instances of a data command can be included in the video stream during a certain phase. For instance, if a training module starts at time particular time, if a user device accesses the feed from the server after the data command has already been sent, the user device will not know what mode to operate within. As such, the data command may be continuously, periodically, a periodically (all referred to as intervals herein) embedded in the video stream. Advantageously, if a user device joins into a training program after it has already started, as soon as the next instance of the data command is received, the user device will know what mode to enter and how to operate.

Another embodiment includes a method for remotely training multiple participants by enabling an operator to create a plurality of training segments and store the plurality of training segments into a library on a server. The server, running a server application, can then present an operator interface to the operator. In some embodiments, the operator interface may include a training program editor and a training program executor. Utilizing the training program editor, an operator can browse the library on the server and create one or more training programs comprising one or more training segments selected from the plurality of training segments and utilizing the program executor, the operator can launch a particular training program.

Once the operator launches a training program, the server performs or enables the operator to perform the actions of:
(a) sequentially selecting a current training segment from the particular training program;
(b) enabling a demonstration mode, wherein during the demonstration mode, the server streams a live video and audio feed received at the server location ("in-studio") to one or more remotely located end user devices;
(c) enabling a trial mode on each of the one or more user devices;
(d) enabling a results mode on each of the one or more user devices; and
(e) repeating actions (a)-(d) of the method until all training segments in the particular program have been processed.

In some embodiments, the operator can control the flow of the training program by causing a transition event or trigger. The transition event or trigger is a signal to the method to transition to a next step. As a non-limiting example, a series of such triggers may result in the method sequentially performing the actions of selecting a next training module or segment, enabling the demonstration mode for the selected training module, enabling the trial mode for the selected training module, and generating and providing a results report. Specifically, in some embodiments the action of invoking the transition may include the operator actuating a remote control device that sends a signal to the server. In yet other embodiments, the server may detect and respond to voice commands for transitioning of the training program. In other modes the trigger can be based on time or other events.

When the server enables the demonstration mode for a particular training module, the server may alert the operator and the one or more user devices that the demonstration mode is active. Once the demonstration mode is active, the server enables the capture of live video and audio of the operator performing one or more tasks required by the training module.

The captured live video and audio is then streamed to the one or more user devices and the user application operates to render the live video and audio on a display screen and speaker communicatively coupled to the user device.

When the server enables the trial mode, the server alerts the operator and the one or more user devices that trial mode is active. The user devices then commence to render the training module on the screen of the user device and then to monitor or track the motion of each user, and/or object controlled by the user, associated with the user device.

Each training module includes one or more physical or motor skill challenges. During the trial mode, the user devices sequentially present the one or more physical challenges on the display screen of the user device, and the camera of the user device tracks the motion of the user and/or an object that is being controlled by the user, such as a ball, bat, club, etc. The user device then operates to compare the motion of the user or object with the actions required by the physical challenge. Thus, the required physical actions may include certain motions of the user and/or the object being controlled by the user.

Another embodiment includes a system for providing real-time remote training for a plurality of participants. The system includes a server that is comprised of one or more processors and a memory element communicatively coupled to the processor. The memory element, among other items, data and information, includes instructions defining a server application. The system further includes one or more user devices that are communicatively coupled to the server through a network. Each user device is also communicatively coupled to a display device and a speaker. Each user device comprises one or more processors and a memory element. The memory element of the user devices include instructions defining a user application.

When executed on the server, the server application is configured to present a user interface to the operator. In an exemplary embodiment, the user interface includes a program editor and a program executor. The program editor enables the operator to create one or more training modules and one or more training programs that include one or more of the training modules. For instance, an operator can browse a library of training segments created by the operator or others, and stored in the memory element of the server. The operator can thus create one or more training programs comprising one or more training modules selected from the library. Utilizing the program executor, the operator can launch a particular training program.

In response to the operator launching the particular training program, the server application is configured to:
(a) Sequentially select a current training segment from the particular program.
(b) Enable a demonstration mode, wherein during the demonstration mode, the server application streams a live video and audio feed received at the server location to the one or more remotely located user devices. To enable this, the server may include a camera and an audio input device and the server application is configured to capture live video and audio of the operator performing one or more tasks required by the training module. The captured live video and audio is then streamed to the user devices. The user application running on each of the one or more user devices is configured to receive and render the live video and audio stream on the display device and speaker communicatively coupled to the user device.
(c) Enable a trial mode on each of the one or more user devices. The server application is configured to cause the one or more user devices to provide an indication that the trial mode is active and thus alert the participants to get into a ready position. Each of the one or more user devices is communicatively coupled to a camera and the user device application is further configured to utilize the camera communicatively coupled to the user device for monitoring the motion of each user and/or object controlled by each user associated with the user device. Each training module includes one or more physical challenges, and the user device application is further configured to:
sequentially present the one or more physical challenges on the display device communicatively coupled to the user device, each physical challenge presenting required actions for a user;

enable the camera communicatively coupled to the user device to track the motion of the user and/or object controlled by the user of the user device by tracking the movement of the user or an observable object; and compare the motion of the user of the user device to the actions required by the physical challenge.

(d) Receive motion data or analyzed metrics based on the motion data from each of the one or more user devices collected during the trial mode.

(e) Analyze the motion data to create a results report or simply store the analyzed metrics.

(f) Enable a reports mode wherein the server transmits the results report to the one or more user devices or requests the one or more user devices to enter the results mode (i.e., to display the analyzed metrics created by the user devices).

(g) Repeat actions (a)-(f) until all training segments in the particular program have been processed.

In some embodiments, the system may include an actuator configured to receive an actuation from the operator and provide successive actuations to the server application to cause a transition of the particular program to the demonstration mode, the trial mode and the results mode. As a non-limiting example the actuator may be a remote control, a smart phone, a fob, or the like. In yet other embodiments, the server may include a voice detector and the operator can invoke transitions by providing voice commands.

These embodiments and other embodiments, features, aspects and functionalities are more specifically described in the detailed description of the various drawings.

BRIEF DESCRIPTION OF THE DRAWINGS

The present invention will be more fully understood from the detailed description of exemplary embodiments considered in conjunction with the following drawings, of which.

DETAILED DESCRIPTION OF VARIOUS EMBODIMENTS

Figure 1:
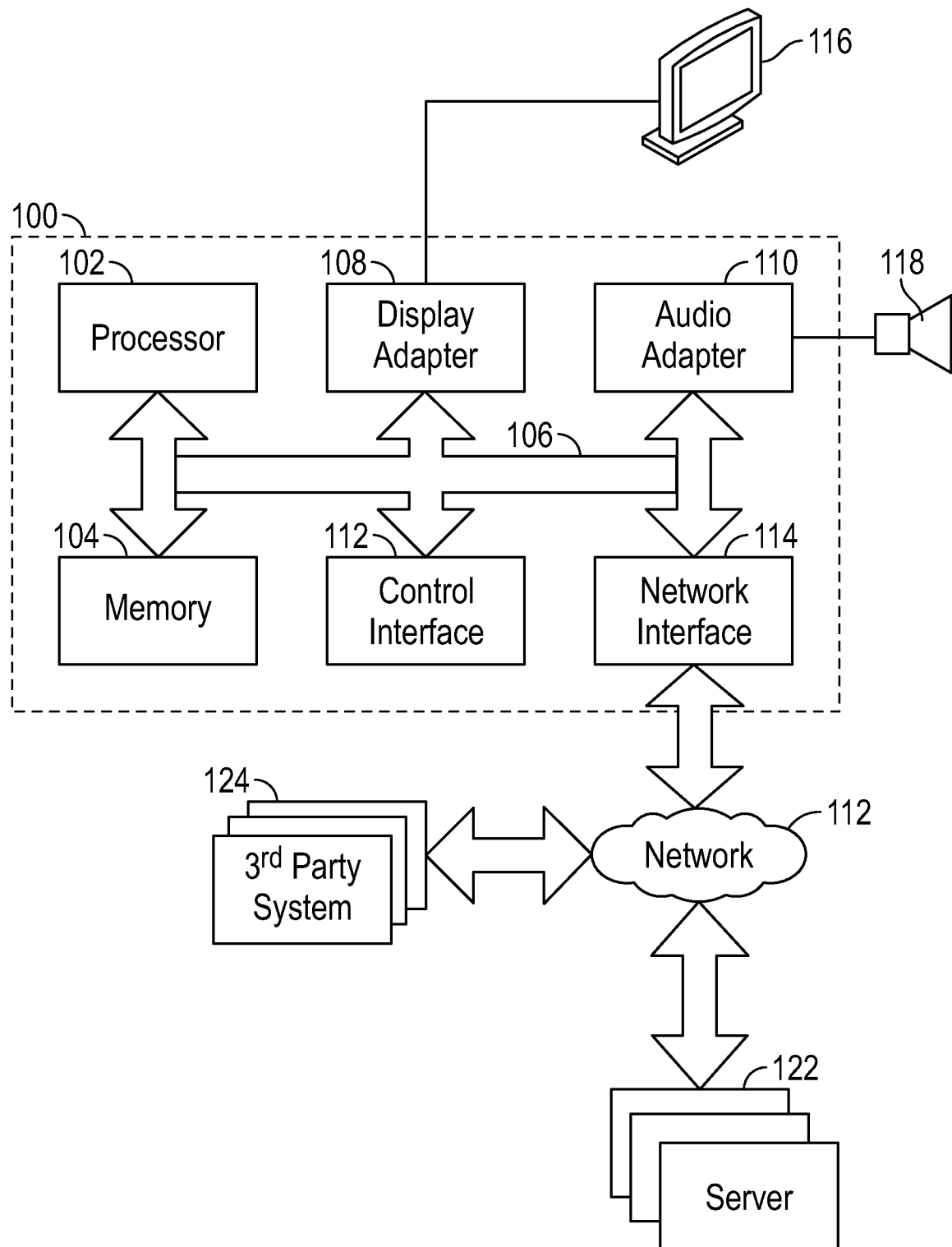
FIG. 1 is a functional block diagram of the components of an exemplary embodiment of system, sub-system, or platform operating as a controller or processor 100 that could be used in various embodiments of the disclosure for controlling aspects of the various embodiments or for implementing all or portions of the disclosed embodiments.

The present invention, as well as features and aspects thereof, is directed towards a synchronized training system in which an operator can present a training program to multiple participants and the training system can monitor and report the performance of the participants.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit", "application", "program" and "module" are used interchangeably. Anything designated as one of these items may be a stand-alone element or incorporated with other elements. Each such items may be any one of, or any combination of, software, hardware, and/or firmware.

In general, an exemplary embodiment is a training system that includes an in-studio system and one or more user systems that are interconnected through a network, such as the Internet. Together, the systems operate to provide an online training system that includes an instructional portion, a performance portion and a results portion. The in-studio system is the brains or control center of the various embodiments of the training system and is manned by a trainer or operator. The trainer or operator may utilize the in-studio system to create training modules and/or training programs. Within this disclosure, the term training module is a training unit that may focus on a certain physical activity, exercise, motor skill, etc. and can be operated in a demonstration mode, training mode, results mode and leaderboard mode as a non-limiting example. Further, within this disclosure, the term training program is a class or training session that includes one or more training modules.

The operator also interacts with the in-studio system to launch a training program in which one or more users, utilizing a user system, can participate. A training program consists of one or more training modules. Each training module is configured to first run in a demonstration mode, in which the operator streams a demonstration of the physical activity required by the training module to one or more user systems. Users can thus view the demonstration of the physical activity on the user systems. The training module then enters a training or trial mode in which each of the participants then engage in performing the physical activity. The user systems present a video/graphical display to show various performance criteria of the training module. The user systems also include a camera that is configured to monitor the activity of the user weighed against the performance criteria. Once the trial mode is completed, the training system switches to a results mode. In the results mode, the monitored activity of the user is presented on the user devices. Upon receiving the command to enter results mode, the user devices may then commence analyzing data collected while monitoring the activity to generate a results report or, the user devices may analyzed the data while it is being collected and simply present the results report upon receipt of the command to enter results mode. In addition, in some embodiments the analyzed and evaluated data may be presented or transmitted to the in-studio server as well. Finally, the training system can enter a leaderboard mode in which the results of all participants can be ordered or ranked and presented back to the in-studio server and/or participants.

During operation, the in-studio system continuously transmits a video feed to the user systems. This video feed may be constructed of different video content for different operating modes. For instance, during the demonstration mode, the video feed may include a live or pre-recorded video performance of the instructor demonstrating the physical activity. The video feed may also include video that provides instructions or guidance to assist the users in the performance of the physical activities, as well as performance targets that the users are to attempt to meet. The video feed may also include results data and/or leaderboard standings based on data collected from the user systems. Other embodiments may also include other video content as well.

As previously mentioned, a technical hurdle in such a system is ensuring that the user systems are synchronized with the video feed. For example, when the training system switches from demonstration mode to trial mode, the user systems must enter the trial mode to start monitoring the motion of the user and/or object while displaying the instructional or guidance video. Due to the fact that such video content can be buffered, the actual time of receipt may vary between the user systems. To ensure that the user systems are synchronized with the video feed, data commands or controls are embedded into the video feed to control the state or mode of the user systems.

With this general understanding of the overall operation of the various embodiments of the training system, specific aspects, features, functionality and operations of the various embodiments are presented in conjunction with the figures.

FIG. 1 is a functional block diagram of the components of an exemplary embodiment of system, sub-system, or platform operating as a controller or processor 100 that could be used in various embodiments of the disclosure for controlling aspects of the various embodiments or for implementing all or portions of the disclosed embodiments. As such, the in-studio system, the user systems and/or components of each could be implemented on such an exemplary platform. It will be appreciated that not all of the components illustrated in FIG. 1 are required in all embodiments or all components of a training system but, each of the components are presented and described in conjunction with FIG. 1 to provide a complete and overall understanding of an exemplary platform that can be utilized for implementing multiple systems.

The controller can include a general computing platform 100 illustrated as including a processor/memory device 102/104 that may be integrated with each other or, communicatively connected over a bus or similar interface 106. The processor 102 can be a variety of processor types including microprocessors, micro-controllers, programmable arrays, custom IC's etc. and may also include single or multiple processors with or without accelerators or the like. The memory element of 104 may include a variety of structures, including but not limited to RAM, ROM, magnetic media, optical media, bubble memory, FLASH memory, EPROM, EEPROM, computer-on-chip, etc. The processor 102, or other components in the controller may also provide components such as a real-time clock, analog to digital convertors, digital to analog convertors, etc. The processor 102 also interfaces to a variety of elements including a control interface 112, a display adapter 108, an audio adapter 110, and network/device interface 114. The control interface 112 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 108 can be used to drive a variety of alert elements 116, such as display devices including an LED display, LCD display, one or more LEDs or other display devices. The audio adapter 110 interfaces to and drives another alert element 118, such as a speaker or speaker system, buzzer, bell, etc. and/or an audio source detector such as a microphone. The network/interface 114 may interface to a network 120 which may be any type of network including, but not limited to the Internet, a global network, a wide area network, a local area network, a wired network, a wireless network or any other network type including hybrids. Through the network 120, or even directly, the controller 100 can interface to other devices or computing platforms such as one or more servers 122 and/or third party systems 124. A battery or power source provides power for the controller 100.

Figure 2:
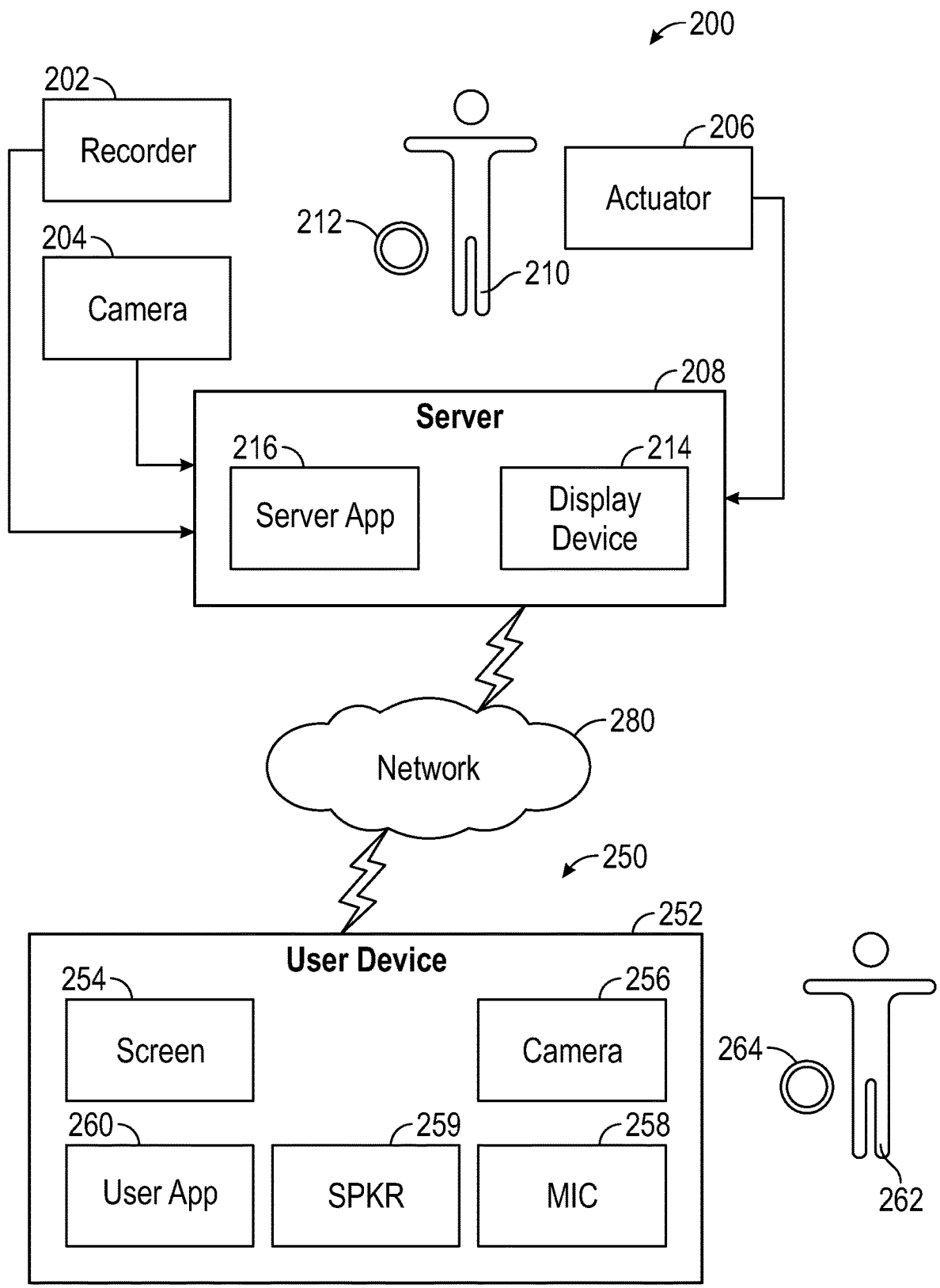
FIG. 2 is a conceptual system diagram on an exemplary embodiment.

FIG. 2 is a conceptual system diagram on an exemplary embodiment of the training system. The illustrated exemplary embodiment includes the afore-described systems or operating centers: (a) in-studio system 200 and (b) user system 250. Although only one user system 250 is illustrated in the diagram, it should be appreciated that any number of user systems can be connected to and operate in conjunction with the in-studio system 200. As such, multiple participants may be engaged in any particular training program.

In an exemplary embodiment, the operation of the in-studio system 200 may allow or enable an operator, instructor or trainer (hereinafter referred to as the "operator") 210 to create, or select already created, training modules to be included in a training program. The training modules, as non-liming examples, may focus on instructing participants to engage in certain physical activities. The in-studio system 200 may also enable the operator to create, or select an already created, training program. The training program typically incorporates a single training module or a series of training modules. As such, a training program can be created to include various physical activities or exercises that are geared towards accomplishing specific goals for the participants. As a non-limiting example, a training program can be geared towards training or improving the offensive skills of a basketball player, the defensive skills of a hockey goalie, skills for a baseball catcher, improvement in speed or agility, etc. Once the operator 210 creates a training program, or selects a previously created training program, the operator 210 can invoke the in-studio system 200 to launch the training program.

Once the training program is launched, for each training module in the training program, the in-studio system 200 first enters a demonstration mode in which the operator 210 performs the physical activity presented in, or focused on, in the training module. The operator's 210 actions are recorded or received by an onsite camera along with any audio instructions that the operator 210 may speak, and the video and audio content are streamed to one or more user systems 250.

The user systems 250 receive and display the streamed demonstration video and/or audio on a display device or screen 254 and then, the in-studio system 200 and the user systems 250 enter the trial mode. In the trial mode, the user systems 250 render a training guide or visual instruction on how to perform the physical activity required in the training module. The user systems 250 also operate to monitor, measure and track the performance of the participants.

Once the trial mode is complete for a specific training module, the in-studio system 200 and the user systems 250 switch to a results mode. In the results mode, data collected by the user systems 250 is reported back to the in-studio system 200 which collects, analyzes and then scores or grades the performance of the participants. This information is then displayed on a display device 214 for the operator 210 and/or reported back to the user systems 250 to be displayed to the users on the screen 254.

Once a specific training module is complete, the in-studio system 200 then proceeds to the next training module in the training program and repeats the process.

Looking more closely at FIG. 2, the in-studio system 200 is illustrated as including a recorder 202, a camera 204, an actuator 206 and a server 208. The server 208 includes a display device 214 and a server application 216. An operator 210 can interface to the server 208 using an input device such as a keyboard, mouse-pad, touch screen, voice commands, the actuator 206 or some other input device. The server 208 is illustrated as including a display device 214 but it should be appreciated that the display device 214 may be integrated with the server 208 or be communicatively coupled to the server 208 either using wired or wireless technology. The server 208, may be a platform as illustrated in FIG. 1. The server application 216 is stored within the memory of the server 208 or may be accessible from external memory, the cloud, etc. In operation, the server application 216 is launched by the operator 210 and presents an operator interface to the operator 210. In an exemplary embodiment, the operator interface may include selectable functions for the operator 210, such as, but not limited to, a program editor and a program executor.

The in-studio system 200 can be accessed by one or more user systems 250 through a network 280. The network 280 may typically be the Internet or a global network but, it is also anticipated that the network 280 can also be a wireless network such as WiFi or Bluetooth for a more localized deployment of the training system.

The user systems 250 are illustrated as including a user device 252. The user device 252 may be a laptop computer, a desk computer, a smart phone, a tablet, a notebook etc. The user device 252 is illustrated as including a screen 254, a camera 256 and a microphone 258. Further, the user systems 250 include a user device application 260 to create the functionality of the user systems 250. The user device application 260 may be internal to the user device 252, or may be accessed from external memory or the cloud. Each user system 250 can connect to and communicate with the in-studio system 200 through network 280. A participant 262 with an actual object 264 (such as a ball, bat, club, etc.) utilizes the user device 252 to participate in a training program.

Although the in-studio system 200 is described as being co-located, it should be appreciated that in some embodiments, the operator 210 may be remotely located from the server. In such an embodiment, the operator 210 may include a similar system as the user systems 250 and be connected to the server 208 through the network 280. Further, the operator 210 would then have a local recorder 202, camera 204 and optionally an actuator 206 and a computing device or communication system that allows each of these components to be communicatively coupled to the server 208. As a non-limiting example, the operator 210 may include a setup or system quite similar to the user system 250, with the exception that the user application that runs on the operator's 210 system would be able to control and operate the server application 216. As an example, the user application 260 may include an operator 210 login function and a participant login function, wherein if an operator logs into the user application, the operator will have additional controls or capabilities not available to the participant.

It should also be appreciated that for embodiments in which the operator 210 includes an operator system that is remote from the server 208, that multiple operators 210 may simultaneously utilize the services of the server 208 to run different training programs and the server 208 can keep track of which operator 210 system is associated with a particular active training program and which participants or user systems are also engaged in a particular training program.

Server Application. The server application provides certain functionality of the in-studio server system 200 when loaded and executed by a processor. The operator 210 interacts with the server application 216 through an operator interface. As previously mentioned, the operator interface may include at least two distinct elements or functions: (1) an editor and (2) a program executor. In embodiments that include the editor, the server application 216 may enable the operator 210 to interact with a training module editor, a training program editor, and a training program previewer. It should be appreciated that not all of these functions are required in any particular embodiment of the training system but, may be included individually or all together in any embodiment of the training system. The program executor enables the operator 210 to launch and present the training program to the participants.

Training Module Editor. An exemplary training module editor may present options for an operator 210 to create a training module from scratch or to modify an existing training module or training module template. A training module can vary in complexity. As a non-limiting example, a training module may simply be a single exercise or physical action that is being required of a participant, trainee, or user (hereinafter referred to as the "participant"). As another non-limiting example, the training module may be a series of exercises or physical actions that can be used to test, train or develop certain motor skills or simply to instruct or guide the participant. Throughout this description, specific examples of applications of the various embodiments will be utilized to further describe the operation of the embodiments. These specific applications should be viewed as non-limiting examples of how embodiments of the invention can be utilized rather than as limitations on the scope of the invention, although certain aspects of the specific applications may also be considered to be patentable inventions or distinguishing limitations for particular embodiments.

One non-limiting example of a specific application is for training participants in the development of ball-handling motor skills for the sport of basketball. As such, a training module in this non-limiting example may simply be focused on one aspect of ball handling, such as dribbling the ball, pivoting with the ball, passing the ball, catching the ball, etc. More complex training modules may focus on certain styles of dribbling the basketball such as low dribble, speed dribble, change-of-pace dribble, crossover dribble, hockey dribble, reverse dribble, half-reverse dribble, high bounce dribble, between the legs dribble, behind the back dribble, wrap around, in and out dribble, V dribble, ankle breaker dribble, hesitation move, etc. In these listed examples, certain movements by the participants can be defined and anticipated. In creating the training modules, the operator 210 can thus create a graphical presentation illustrating the required physical activity.

Figure 3:
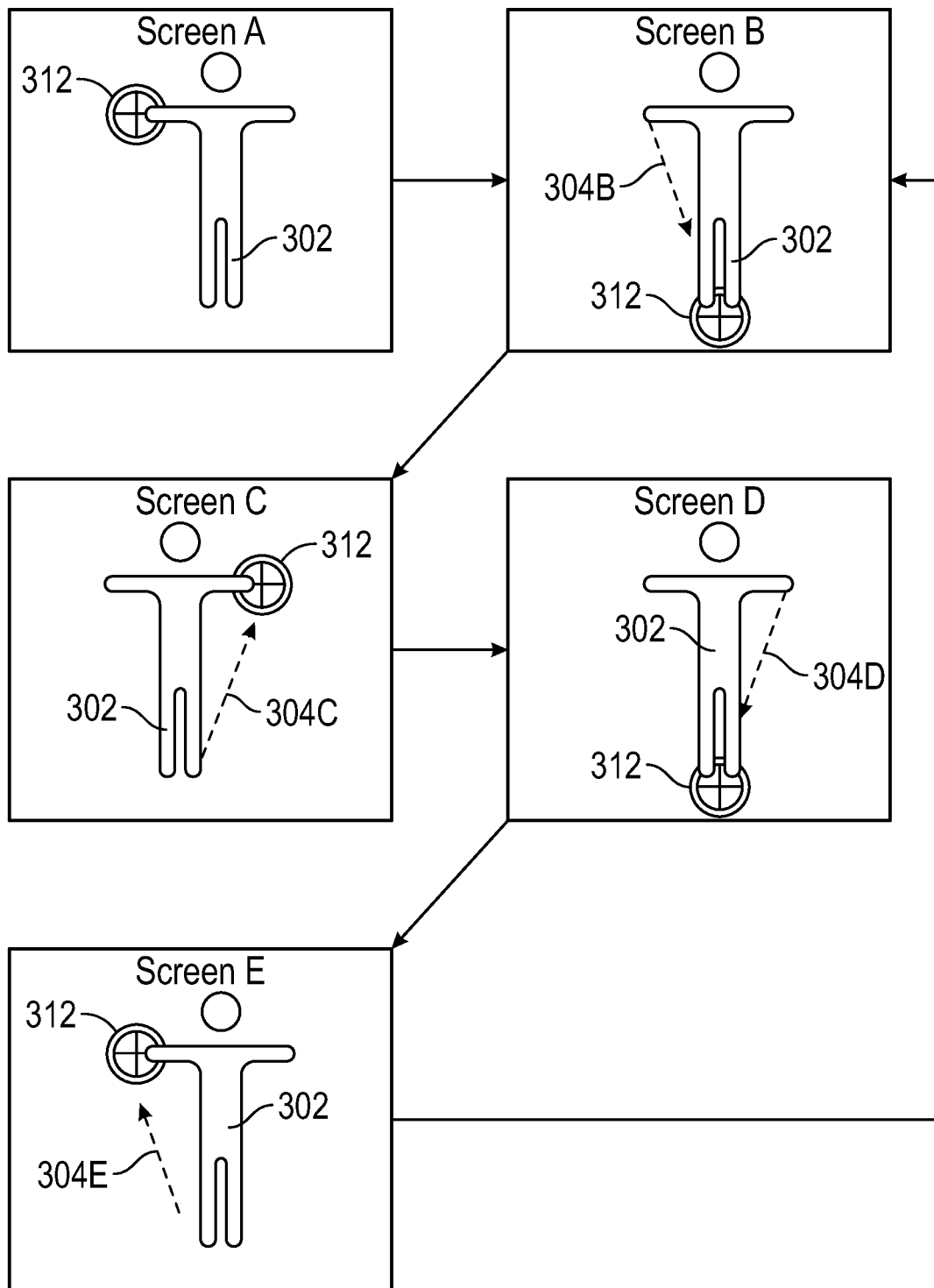
FIG. 3 is a conceptual illustration of a series of screens that can be created by an operator 210 for a V dribble training module.

FIG. 3 is a conceptual illustration of a series of screens that can be created by an operator 210 for a V dribble training module. The operator 210 can create the V dribble training module utilizing the training module editor. In the illustrated embodiment, the V dribble training module is shown as including a series of screens that are progressed through to facilitate training the physical activity of the V dribble. Initially screen A is displayed which may be considered a ready state or the state that the viewer, such as the operator or participants, needs to get into prior to the training module starting. The user is thus instructed to hold the ball (simulated as target 312) in the user's right hand. The V dribble training module screen then transitions to screen B illustrating that the user is to dribble the ball towards the front middle of the user 302 as indicated by the arrow path 304B and the position of the target 312. The V dribble training module then transitions to screen C illustrating that the ball will then rebound on the path of arrow 304C to the user's left hand illustrated by the position of the target 312. The V dribble training module then transitions to screen D illustrating that the user is to dribble the ball, using the user's left hand, towards the front middle of the user 302 as indicated by arrow path 304D and the position of the target 312. The training module then transitions to screen E indicating that the ball then rebounds on the path of arrow 304E back to the user's right hand as illustrated by the position of the target 312. The training module may then stop or it may transition back to screen B to repeat the process.

In creating, defining or modifying the training module, the operator 210 can select a number of repetitions for the training module to cycle through, as well as define other parameters for the physical activity, such as but not limited to the distance of ball travel (i.e., the user is standing or squatting) the speed of ball travel (i.e. which may be reflected in the speed of screen transitions) etc.

It should be appreciated that the use of successive screens for implementing the training module is only provided as a non-limiting example that is conducive to illustrate the overall operation of the training module. Other embodiments which cannot readily be illustrated in a specification and still drawing may also be utilized. For instance, rather than transitioning to different screens as illustrated, the training module may be more of a live/active video in which the illustrated target 312 actually moves on the screen as a video rather than switching from screen to screen. Further, in some embodiments, each of the target 312 positions may be illustrated at the same time and the current desired position of the ball may be highlighted in some fashion. In yet other embodiments, each of the target 312 positions may be illustrated at the same time and as the actual ball being utilized by the user moves, the target 312 on the screen changes to show the current position of the ball.

In some embodiments, the training module is presented as an overlay of a video of the participant. As such, the video of the participant and the ball, in the illustrated example, are presented on the screen 254, and the target 312, motion indicators, etc., are overlaid on the participant video thus allowing the participant to visually gauge his or her performance of the physical activity.

In each of these embodiments, an element of the training module is a simulated object that correlates to an actual object that is utilized by a user. A goal of the training module is to demonstrate or guide the user in the required physical activity and then monitor the actions of the user to determine how close the user's performance tracks with the simulated physical activity in the training module. The object that is being utilized by the user of the user system 250 is configured to be tracked by the user device 252. This can be accomplished in a variety of manners. In one embodiment, the actual object utilized by the user may have a special design, color or indicia that can be easily tracked by the camera 256 and user application 260 of the user device 252. In other embodiments, the actual object may include other technologies such as accelerometers, GPS receivers, RFIDs, etc. that work in communication with the user device 252 to track the motion, position and location of the actual object.

As such, in the illustrated non-limiting example, the training module shows the physical activity that the user is required to perform. Each training module in a training program may run for a defined number of repetitions, a specific amount of time, until certain performance criteria are met, or may run perpetually until the operator 210 causes a transition.

The training module editor may enable the operator 210 to create a variety of physical activities, such as the illustrated ball movements for a V dribble, and then allow the operator 210 to save the training module on the server 208, such as in a library of training modules. Other non-limiting examples of physical activities that can be utilized in a training module include movements of an epee in a fencing training module, movements of a barbell in a weight lifting training module, movements of a golf club in a golfing training module, movements of a bat in a baseball swing training module, movements of a device in a magic trick training module, etc.

Figure 4:
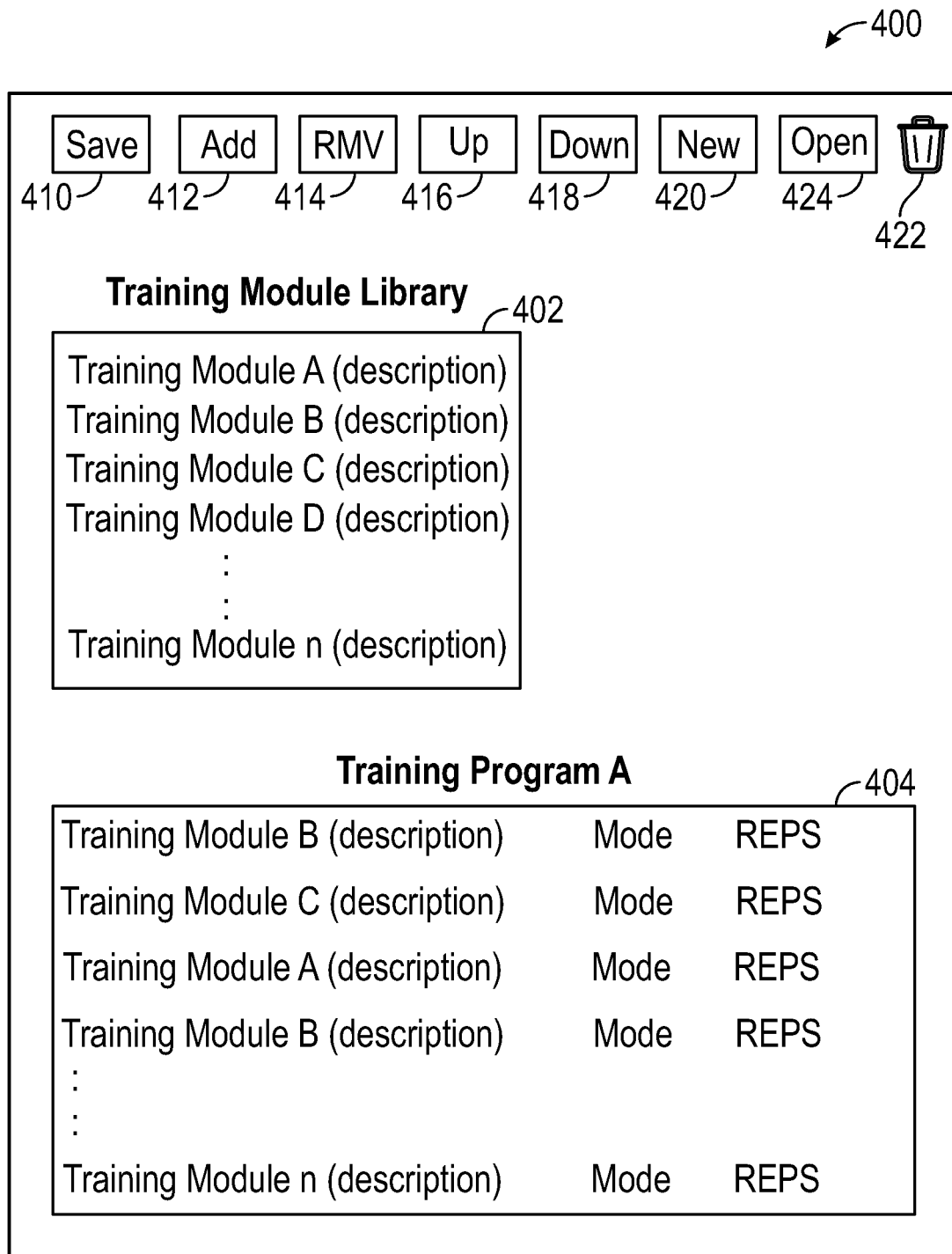
FIG. 4 is a conceptual illustration of a training program editor that could be employed in various embodiments of the training system.

Training Program Editor. The operator interface may also include a training program editor. The training program editor enables an operator 210 to select one or more training modules to be included in a training program. The training program editor may present a list of training modules available to the operator 210 and the operator can select the training modules to be included in a training program, select the order of the training modules, select the complexity of the training modules, etc. FIG. 4 is a conceptual illustration of a training program editor that could be employed in various embodiments of the training system. The operator interface screen 400 includes a window showing the library of training modules 402 that can be selected for a training program. In the illustrated embodiment, the library is shown as including Training Module A-n. Each training module may include, among other things, a name, such as Training Module A, and a description of the training module. Other information may also be included for the training module such as, the name of the creator, the length in time of the training module, a list of sports that are applicable to the training module, an indicator of the popularity of the training module by participants and/or operators, the number of times the training module has been included in a training program, etc.

The operator interface screen 400 also includes a window to show the training program being created 404. In the illustrated embodiment, the operator 210 has selected Training Module B, Training Module C, Training Module A and Training Module B again. As a non-limiting example, the operator can also set a MODE for a selected training module. The mode may identify the difficulty of the training module, such as EASY, INTERMEDIATE, PROFESSIONAL. As another example, the MODE for the training module may be listed different levels such as LITTLE LEAGUE, HIGH SCHOOL, COLLEGE, PROFESSIONAL, etc. It should be appreciated that in some embodiments, the training modules may be created for certain skill levels and as such, the operator 210 can select training modules based on the identified skill level of the training module. The operator 210 may set the number of repetitions (REPS) for the training module, such as the number of times that the training module will repeat or the amount of time that a training module will operate before going to the next training module. In some embodiments, the REPS may also include a category of OPERATOR CONTROL, indicating that the training module will continue to be active until the operator takes an action to move to the next training module, or PERFORMANCE CONTROL, indicating that the training module will continue until certain performance criteria are met. The performance criteria may include, as a non-limiting example, a requirement that a certain percentage of the participants must reach a threshold accuracy level before the training module stops. As a non-limiting example, 20% of the participants need to be performing at 90% accuracy level in the physical activity before a transition can occur. Other embodiments may include other features such as entering notes that can be displayed only to the operator 210 to help guide the training session, entering notes and words of encouragement to be displayed or audible played to the participants, selecting background music to be played for the training program or the training modules, etc.

In the non-limiting operator interface example, the operator is presented with a variety of controls that the operator can use in creating the training program. Initially, the operator may begin the creation of a training program by selecting the NEW control 420. The operator can then add training modules to the training program by selecting a training module from the training module library 402 and dragging it to the training program window 404 or actuating the ADD control 412. Likewise, the operator can select a training module that is listed in the training program window 404 and either drag it to the trash can 422 or actuate the remove (RMV) control 414.

The operator can change the order of the training modules in the training program by selecting a training module in the training program window 404 and dragging it up or down in the list. Alternatively, the operator can select a training module and actuate the UP control 416 or DOWN control 418 to move the training module up or down in the list.

When the operator is satisfied with the training program, the operator can select the SAVE control 410 to save the training program for later use. The operator 210 may then be requested to provide a name for the training program and may also be allowed to set access and modification privileges for the training program. It should be appreciated that the operator 210 can also select the OPEN control 424 to pull up a list of already created training programs that can be edited or deleted.

Training Program Previewer. The operator interface may also include a training program previewer. The training program previewer can allow the operator to run through a training program, such as to simulate the presentment of the training program, to determine the length of time that the training program will run, observe the flow of the training program determine the difficulty of the training program, take notes on instructions and script the training program, etc. Embodiments may allow the operator to pause, fast forward, exit the training program or switch to training program editing mode from the previewer. It should be appreciated that the training program previewer may also work on the training module level, thus allowing an operator 210 to preview a training module before adding it into a training program.

Figure 5:
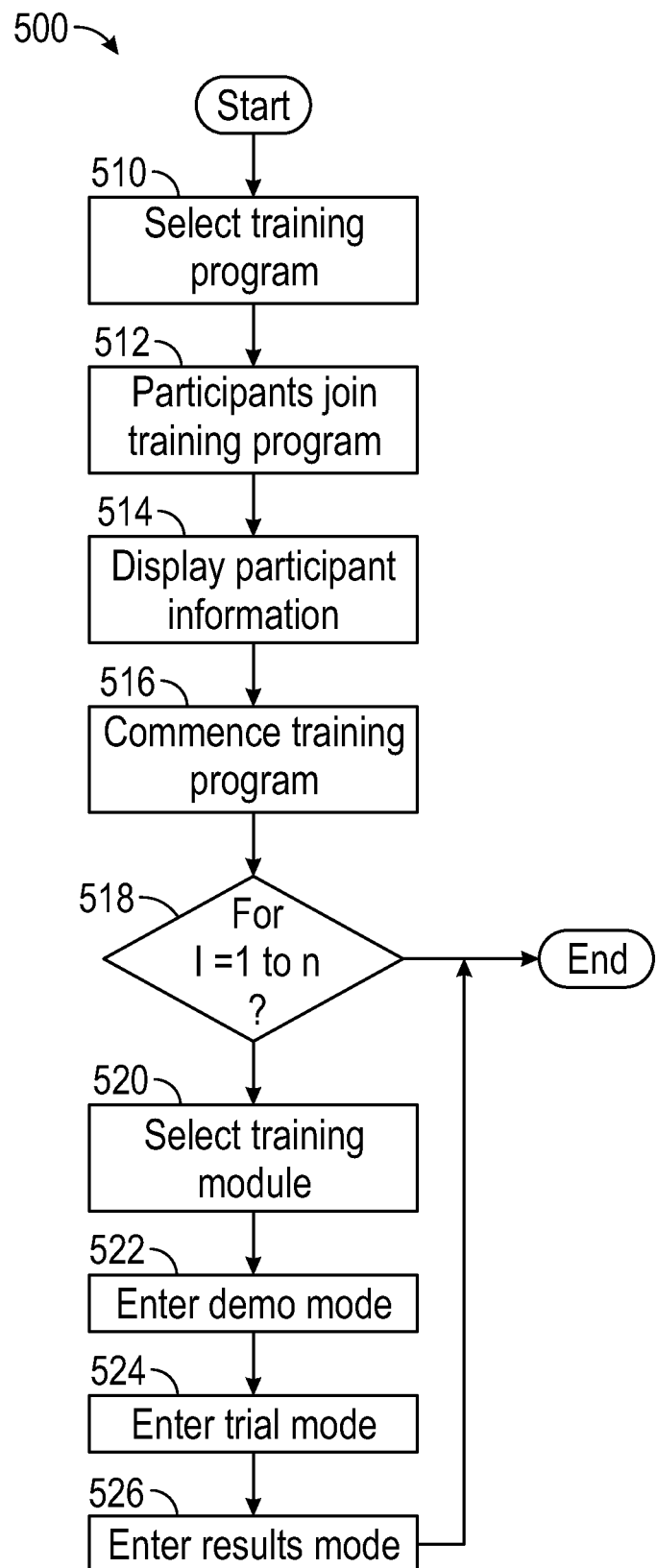
FIG. 5 is a flow diagram illustrating the operation of the system after launching of a training program.

Program Executor. The program executor of the server application 216 enables the operator 210 to select a training program and then launch and present the training program to the participants. FIG. 5 is a flow diagram illustrating the operation of the system after launching of a training program. The flow of operation 500 will also be described with reference to the system components presented in FIG. 2. Initially, the operator 210 selects a training program 510 from the list of available training programs available on the server 208. An initial screen can then be presented to the operator 210 on the display device 214 to show that the training program is ready to begin. When launching, the operator 210 may have the option to select the time that the training program will begin. The server application 216, upon the launching of the training program, may also provide a push indication or notice to one or more user systems 250 that the training program is about to begin. Alternatively, or in addition to, the user systems 250 can connect to the in-studio system 200 devices to identify a schedule for upcoming training programs and then select a training program in which to participate. It should be appreciated that the server application 216 can provide the push notifications to the user systems 250 by either directly communicating with the user systems 250 or be sending messages such as emails, text messages, SMS messages, etc. to notify the participants that a training program is about to begin or to invite participants to a training program. In any of these scenarios, the server application 216 may include a period of time for various participants to join in to the training program 512. Once a user system 250 has joined into a training program, a screen can be presented to the user device 252 to indicate who all is joined into the training program and when the training program will commence.

As participants are joining into the training program, the server application 216 may present this information 514 to the operator 210 on the display device 214. The information presented may include the name or user name of the participant, a picture of the participant and other information about the participant such as skill level, number of times they have participated in the training program etc. In addition, the server application 216 may also transmit this information, or a subset of this information, to the user systems 250 so that other participants can see who they are participating with.

Once the participants have joined into the training program, the training program can commence 516. The commencement of the training program may be triggered by a certain time of day, an action by the operator 210, a limit of the number of participants being reached, etc. as well as a combination of two or more such triggers.

When the training program is commences, a first training module from the list of training modules in the training program is selected by the server application 216. If the training program only includes one training module, that training module is run and then the training program is complete. However, for training programs that include multiple training modules, the server application 216 enters a loop 518 in which the training modules are performed serially until the entire training program has been completed or otherwise stopped or paused by the operator.

In the illustrated flow, it is assumed that the training program includes "n" training modules. The server application 216 then selects the first training module 520 and then enters the demonstration mode for the training module 522. During the demonstration mode, the simulated physical activity of the training module can be presented on the display device 214 of the server 208 and the operator 210 can perform the physical activity. The camera 204 and the recorder 202 can collect video actions and voice instructions of the operator 210 and then record the audio/video content and store it in the server 208 for non-real-time systems and/or stream the audio/video for real-time systems to the user systems 250 over the network 280.

Each of the participants that have joined into the training program can receive the streaming audio/video in real-time and the video can be presented on the screen 254 and speaker 259 by the user application 260. The physical requirements, such as target positions etc. as describe in conjunction with FIG. 4 can be overlaid on the streaming video from the operator and/or displayed on the display device 214 for the operator 210.

Once the demonstration is complete, the server application 216 transitions to the trial mode 524. The transition to the trial mode can be triggered in a variety of manners. In one embodiment, the operator 210 may actuate the actuator 206 to trigger the transition. In other embodiments, the transition may be triggered after a certain amount of time, a certain number of repetitions of the physical activity, a voice command from the operator 210, etc. In transitioning to the trial mode, the server application 216 sends a control signal to each of the user system 250 to indicate that the trial mode is being entered.

Upon reception of the control signal from the server application 216, the user application 260 in each of the user devices 252 also enable the trial mode. In enabling the trial mode at the user systems 250, the user application 260 receives the training module video data or other data from the server application 216 and begins rendering it upon the screens 254 of each user device 250 in a synchronized manner Thus, all participants are synchronized in performing the physical activity. The user application 260 also enables the camera 256 to begin tracking the physical activity of the user 262 and/or the object 264 utilized by the user in view of the definition of the physical activity in the training module. For example, the training module may have certain target positions and motion requirements that the user must satisfy, such as moving a ball from one location to another location at a certain speed. The user application 260 is able to synchronize the training module with the activity of the user 262 and object 264 to identify if the user 262 is satisfying the physical criteria. A detailed description of this aspect of the user application 260 and its configuration for identifying a moving object in a video and mapping the motion of the object to a particular drill in a training module can be seen in U.S. Pat. No. 9,275,470B1 which is above-incorporated by reference. The present solution expands the functionality of the invention presented in U.S. Pat. No. 9,275,470B1 such that live classes may be conducted with a plurality of remote users over the Internet. The operator "controls" the user application 216 of each remotely connected user device 252 via signals sent over the live stream connection. In this way, the operator 210 may guide a plurality of remote participants through a series of drills in a workout. Further, the server application 216 may also send a timing control signal to ensure that each of the user systems 250 remain in sync.

During the trial mode, the user application 260 gathers performance data pertaining to the physical activities of the user 262. In the various embodiments, this performance data can be processed by the user application 260 and/or the server application 216 to rank and score the performance of the user. Many techniques can be utilized in ranking the user performance. As a non-limiting example, looking at the V dribble training module as presented in FIG. 3, the user performance can be ranked based on the number of times that the user 262 was able to position the basketball within the required target area within the allotted time frame. For example, the training module may allot a time t1 for the user 262 to transition the basketball 264 from the screen A position, to the screen B position, time t2 to transition the basketball 264 from the screen B position to the screen C position, time t3 to transition the basketball 264 from the screen C position to the screen D position, and time t4 to transition the basketball 264 from the screen D position to the screen E position. The ranking can take into consideration the accuracy of the user 262 in hitting the target positions 312 illustrated in FIG. 3 for the training module and the accuracy of meeting the time allocations. As a non-limiting example, the participant 262 may be credited with a single point by getting the object 264 into the target position 312 within the allotted time. If the participant 262 is slightly off of the target position 312, the point may be withheld or reduced depending on the severity of missing the targeted requirements. If the user 262 hits the location targets 312 but misses the time target, the user 262 may be credited with only a half point. If the user meets the time target but is slightly off on the positioning target, the user may be credited with ¾ of a point. If the user meets the time target and totally misses the positioning target, the user may be credited with ¼ of a point. During the trial mode, the user application 260 can tally all the points for the user and then provide a point total to the server application 216 at the end of the trial mode. In other embodiments, the user application 260 may only gather information about the performance of the user 262 and transmit this data to the server application 216 for ranking and scoring the performance of the participant 262. It should be appreciated that other ranking techniques may be applied and more or fewer performance criteria parameters may be utilized in such ranking techniques and the present application is not limited to any particular ranking technique.

Once the trial mode is completed, the server application 216 causes a transition to the results mode 526. The transition to the results mode can be triggered in a variety of manners. In one embodiment, the operator 210 may actuate the actuator 206 to trigger the transition. In other embodiments, the transition may be triggered after a certain amount of time, a certain number of repetitions of the physical activity, as well as other triggering events described herein. In transitioning to the results mode, the server application 216 sends a control signal to each of the user system 250 to indicate that the results mode is being entered.

In the results mode, the server application 216 can process the performance data received from each of the user systems 250 that participated in the training module. The server system 216 can rank the participants based on their score and then present the information on the display device 214 of the server 208 and/or transmit the information to each of the user systems 250, where the user application 260 can display the results on the screen 254 of the user device 252.

Once the results have been presented, the server application 216 can then examine the training program again to determine if there is another training module to be processed 518. If another training module is in the training program, the server application can select and load the next training module 520 and continue processing the training module in the loop. Otherwise, if all of the training modules have been processed, then the training program can be terminated.

It should be appreciated that while the demonstration mode, trial mode and results mode have all been described as a state diagram in which only one state exists or is active at a time. However, in some embodiments, the modes may overlap or be coexistent. For instance, in one embodiment, the operator 210 can perform the physical activities of the demonstration mode and the server application 216 can stream the audio/video of the operator 210 to the user systems 250. Simultaneously, the user systems 250 may present the audio/video stream of the operator 210 on a portion of the screen 254 and present the trial mode screens or video on another portion of the screen 254. In such embodiments, the user 262 can watch the actions of the operator 210 while the user 262 is performing the actions as well. In other embodiments, the user application 260 may gather performance data during the trial mode and immediately send the performance data to the server application 216. The server application 216 can then start ranking the performance of the users 262 and displaying performance results on the display device 214 and transmitting the performance results to the user systems 250 where the user application 260 can present the rankings on the screen 254. Thus, the trial mode and the results mode may also be coexistent. In yet another embodiment, the demonstration mode, trial mode and results mode may all be coexistent.

Figure 6:
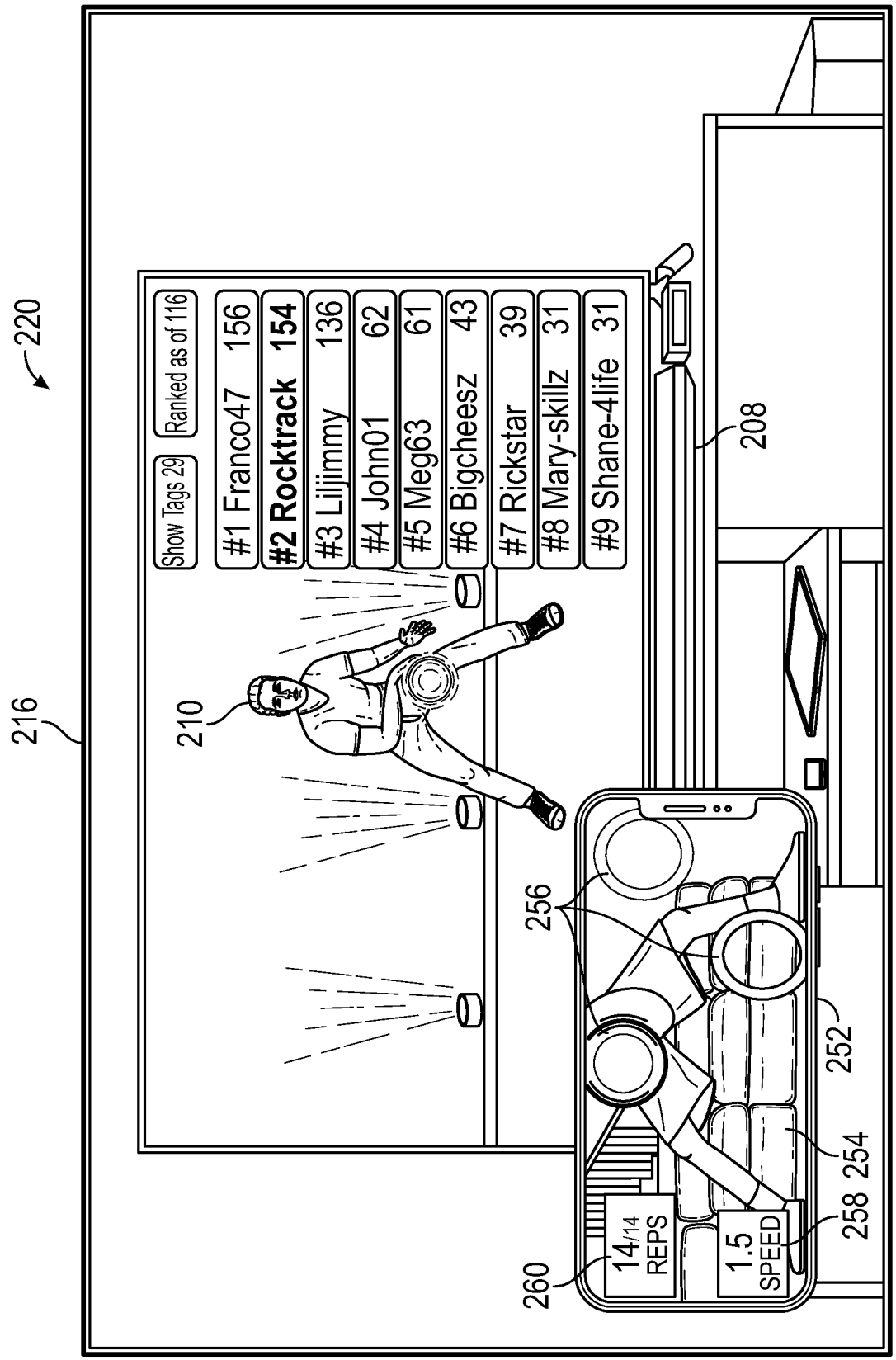
FIG. 6 is a photograph of the display device of the in-studio system 200 and the user system 250 illustrating an exemplary implementation of a training system.

FIG. 6 is a photograph of the display device of the in-studio system 200 and the user system 250 illustrating an exemplary implementation of a training system. In the illustrated embodiment, the operator 210 is presented on the display device 216 of the server 208. The screen 254 of the user device 252 is illustrated as showing positioning targets 256 for moving a basketball to, as well as providing a speed indicator 258 and a repetition count 260. The display device 216 of the server 208 also presents a ranked list of at least some of the participants in the training module by listing the name of the participant and their current score 220.

Synchronization and Command Control.

Another aspect of the various embodiments of the present invention is the use of embedded data within the video signal or video stream that is sent to the various user devices to provide synchronization of the user devices with the video stream and to otherwise control the user devices. Those skilled in the relevant art will be aware that the video streamed to the user devices may traverse different paths. Some of these paths may be over wired networks, wireless networks or a combination of both. Further, some of these paths may be more congested, lossy, or have less bandwidth etc. than the other paths. As such, the buffering applied to the various communication paths leading to the various user devices will inevitably result in the user systems receiving and rendering the video out of synchronization with each other. Because of this fact, the use of a timer is not a practical solution for ensuring that the user devices are synchronized with the video feed. Thus, the various embodiments may embed data or commands within the video feed to provide synchronization of each user device with the video feed.

In an exemplary embodiment, each training module includes or defines multiple phases or modes. As previously described, an embodiment may utilize a training module that first includes a demonstration phase, followed by a trial phase, then followed by a results phase and finally a leaderboard phase. During each of these phases, the user devices need to operate in different modes (i.e., demonstration mode, trial mode, results mode, leaderboard mode respectively). For example, when a training module begins, the user devices need to be set to demonstration mode in which the user devices receive a live video stream and then render it on a display device. When the training module enters the trial phase, the user devices need to change what is being displayed (i.e. present the live instructor feed in one window and the positioning targets video in another window or stop presenting the live feed and switch to the positioning targets video) and the user devices need to activate and control the camera to monitor the participant activities. Further, when the training module enters the results phase, the user devices need to switched to the results mode in which the user devices send the collected motion data to the server and then receive results data. Finally, when the training module enters the leaderboard phase, the user devices need to transition to the leaderboard mode to display the newly received content.

Figure 7:
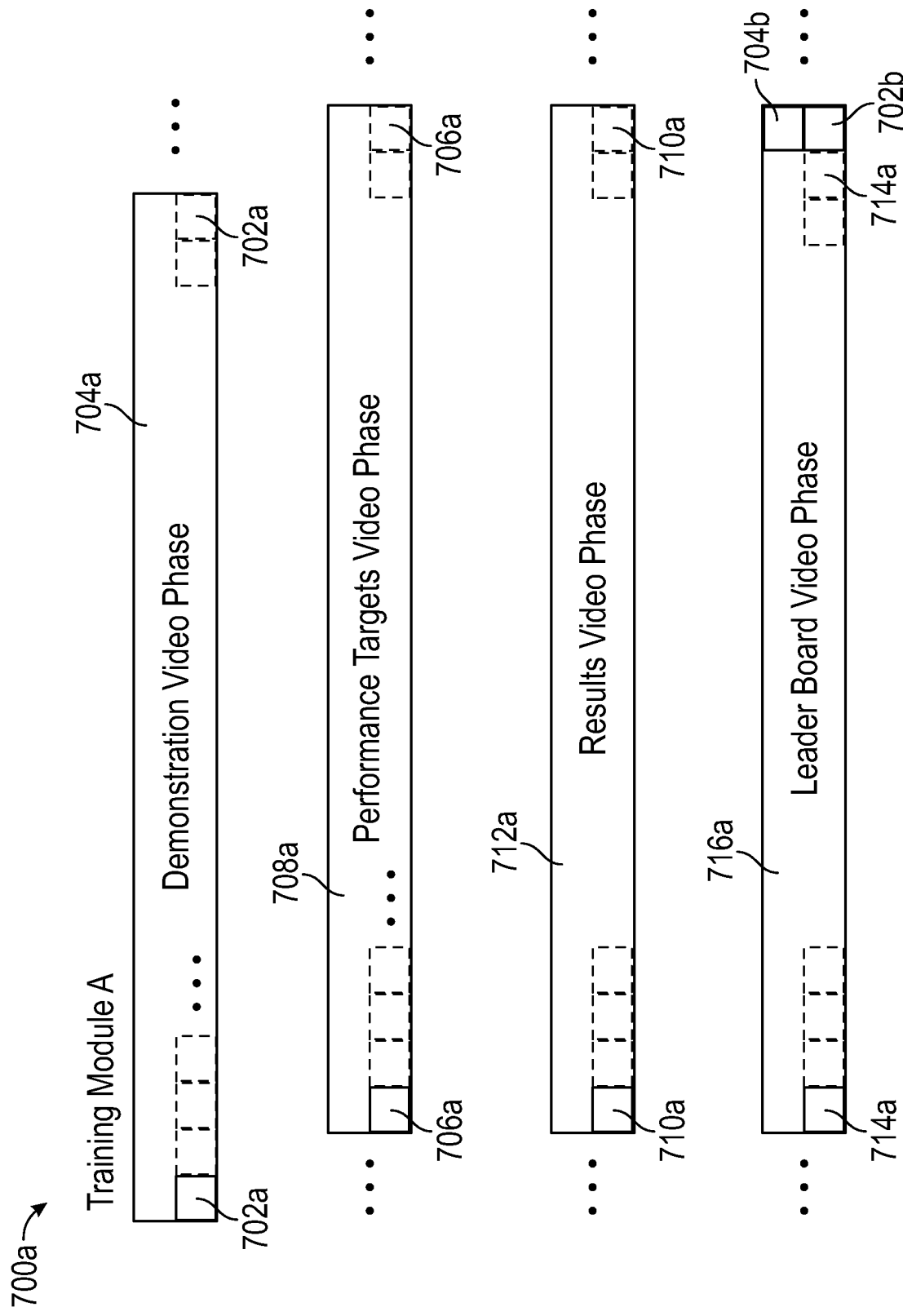
FIG. 7 is a signal diagram representative of the use of embedded data commands to provide synchronization of the user devices with the video content and server application for various embodiments.

In some embodiments, the synchronization of the modes of the user devices to the training module phases is accomplished by embedding data signals within the video data that is transmitted to the user devices. FIG. 7 is a signal diagram representative of the use of embedded data commands to provide synchronization of the user devices with the video content and server application for various embodiments. In the illustrated non-limiting example, training module A 700a is being processed. The enter demonstration mode command 702a is embedded at the beginning of the demonstration phase 704a by embedding it within the video stream to the user devices. The demonstration mode command 702a operates to place the user systems 250 and user device 252 into demonstration mode. When the training module A 700a enters the trial phase, the enter trial mode command 706a is embedded into the streaming video at the beginning of the performance targets phase 708a (or the end of the demonstration phase 706a) to cause the user systems 250 to switch to trial mode. Likewise, when the training module A 700a enters the results phase, the enter results mode command 710a is sent at the beginning of the results video phase 712a (or the end of the performance targets video content 708a) to cause the user systems 250 to switch to the results mode. Finally, when the training module A 700a enters the leaderboard phase, the enter leaderboard mode command 714a is sent at the beginning of the leaderboard video phase 716a (or the end of the results video content 712a) to cause the user systems 250 to enter the leaderboard mode. At this point, if additional training modules are available in the training program, the enter demonstration mode command 702b is sent at the beginning of the demonstration video content 704b (or the end of the leaderboard phase 712a) to cause the user systems 250 to transition back to the demonstration mode. Thus, it will be appreciated that as the user systems 250 receive the video content, they are synchronized to the video content by the embedded commands that trigger them to switch to the correct mode of operation. Using broken lines, it is illustrated that the data commands can be embedded at the beginning of a phase, as well as any point during the phase. As a non-limiting example, the demonstration mode command 702a can be sent at the beginning of the demonstration phase and/or at various points of time during the demonstration phase. Preferably, the demonstration mode command 702a is included at the beginning of the demonstration phase 704a, and then at intervals during the demonstration phase 704a.

In some embodiments, the operator and/or the in-studio system can send other commands to user systems 250 to further control the operation of the user systems. As a non-limiting example, the operator 210 can control what the user application 260 is presenting on the screen 254 of the user device 252. Thus, the operator can cause the user applications 260 to only display the training module operation and the video of the user performing the required physical activities. If the operator 210 sees that participants are having trouble, the operator 210 can send a command to one or more of the user systems 250 to cause the user application 260 to receive and display the live stream of the operator 210 performing the physical activity or to replay the original video obtained during the demonstration mode. This can be displayed by itself or juxtaposed on the screen 254 with the training module and video of the user.

In some embodiments, the operator 210 may also be able to send a command to a user system 250 to direct the user application 260 to not only monitor the participant, but to also stream the video, and maybe audio, of the participant to the server system 200. Thus, if the user application 260 detects that a participant is not scoring at least at a minimum threshold level, the user application 260 may send a notification to the server application 216 to indicate that the participant may need help. The server system may flag this information on the display device 214 so that the operator 210 is made aware. The operator 210 may then chose to have the server application 216 send a command to the user system 250 forcing the user system 250 to stream the audio/video of the participant. The server application 216 can then render this live stream on all or a portion of the display device 214 for the operator 210 to observe. The operator 210 can then give audible and/or visual feedback to the participant 262 through the server system 200.

Similarly, in some embodiments, the server application 216 may not only be able to receive the real-time stream of a participant but also may be able to rebroadcast the stream to other user devices 250. Thus, if a certain participant is excelling on a physical activity, the operator 210 can have that participant's live feed streamed to other participants as an example. Or, if the participant is experiencing a certain problem, the operator 210 can stream the participant's video as an example to other participants about techniques to avoid.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method for providing remote training to a plurality of participants, the method comprising:
  selecting and executing a particular training program residing in the memory of a server, wherein executing the particular training program comprises the following actions:
    establishing communication links to one or more participant devices uniquely associated with one or more participants;
    determining a current operational mode of the one or more participant devices, wherein the current operational mode is either a demonstration mode or a performance mode;
    transmitting video content associated with the current operational mode to the one or more participant devices, wherein video content associated with a demonstration mode includes a demonstration video of an instructor performing a physical activity that a participant is expected to perform, and wherein video content associated with a performance mode includes physical and timing performance targets that a participant is expected to meet; and
    embedding data commands within the video content;
  wherein each participant device is configured to display the video content and, in response to receiving a particular embedded data command, each participant device:
    collects motion data that represents physical activities of an associated participant;
    analyzes the motion data to create a results report; and
    presents the results report on a display and/or transmits the results report to the server.

2. The method of claim 1, wherein the action of embedding data commands within the video content further comprises embedding data commands at intervals within the demonstration video to instruct the user devices receiving the demonstration video to enter a demonstration mode.

3. The method of claim 2, wherein each of the participant devices, after receiving a data command to enter the demonstration mode, renders the demonstration video on the display.

4. The method of claim 3, wherein the demonstration video is a live video feed and the method further comprises the actions of the server capturing live video and streaming the live video in the video content.

5. The method of claim 3, wherein the demonstration video is a pre-recorded video and the method further comprises the actions of the server reading the demonstration video from a memory element of the server and streaming the pre-recorded video in the video content.

6. A system for remote training, comprising:
  a server including a processor and a memory element communicatively coupled to the processor, the memory element including instructions defining a server application that, when executed by the server, launches a particular training program; and
  one or more participant devices communicatively linked to the server, each participant device communicatively coupled to a camera, a display device and a speaker, wherein each of the one or more participant devices includes a processor and a memory element, the memory element of each including stored instructions defining a participant device application;
  wherein when the particular training program is launched, the server:
    determines a current operational mode of the one or more participant devices, wherein the current operational mode is either a demonstration mode or a performance mode;
    transmits video content associated with the current operational mode to the one or more participant devices, wherein video content associated with a demonstration mode includes a demonstration video of an instructor performing a physical activity that a participant is expected to perform, and wherein video content associated with a performance mode includes physical and timing performance targets that a participant is expected to meet; and
    embedding data commands within the video content; and
  wherein each participant device is configured to display the video content and, in response to receiving a particular embedded data command, each participant device:
    collects motion data that represents physical activities of an associated participant;
    analyzes the motion data to create a results report; and
    presents the results report on a display and/or transmits the results report to the server.

7. The system of claim 6, wherein the action of embedding data commands within the video content further comprises embedding data commands at intervals within the demonstration video to instruct the user devices receiving the demonstration video to enter a demonstration mode.

8. The system of claim 7, wherein each of the participant devices, after receiving a data command to enter the demonstration mode, renders the demonstration video on the display.

9. The system of claim 8, wherein the demonstration video is a live video feed and the method further comprises the actions of the server capturing live video and streaming the live video in the video content.

10. The system of claim 8, wherein the demonstration video is a pre-recorded video and the method further comprises the actions of the server reading the demonstration video from a memory element of the server and streaming the pre-recorded video in the video content.

* * * * *